United States Patent [19]

Avalon

[11] 3,882,297

[45] May 6, 1975

[54] WATER COOLED GRID RESISTOR ASSEMBLY FOR RADIO FREQUENCY INDUCTION HEATING GENERATOR

[75] Inventor: Robert J. Avalon, Burton, Ohio

[73] Assignee: Park-Ohio Industries, Inc., Cleveland, Ohio

[22] Filed: May 28, 1974

[21] Appl. No.: 473,382

[52] U.S. Cl. ............... 219/10.75; 165/108; 331/69; 338/55; 338/267; 338/302

[51] Int. Cl. .............................................. H05b 9/00

[58] Field of Search ............... 338/53, 55, 267, 302; 331/187, 68–70; 219/6.5, 10.47, 10.49, 10.51, 10.57, 10.75; 165/108, 104

[56] References Cited

UNITED STATES PATENTS

| | | | |
|---|---|---|---|
| 500,288 | 6/1893 | McElroy | 338/55 X |
| 1,433,750 | 10/1922 | Spooner | 338/53 |
| 2,215,184 | 9/1940 | Lindenblad | 338/55 |
| 3,300,746 | 1/1967 | Franz | 338/55 |
| 3,611,244 | 10/1971 | Morimoto et al. | 338/267 |

*Primary Examiner*—C. L. Albritton
*Attorney, Agent, or Firm*—Meyer, Tilberry & Body

[57] ABSTRACT

A water-cooled grid resistor assembly is provided in the oscillator circuit of a vacuum tube radio frequency generator for induction heating equipment. The grid resistor assembly includes at least two power resistors connected in series and mounted within a housing of insulating material through which cooling water is circulated. The grid resistor assembly is supported within an equipment cabinet for the oscillator circuitry and is connected in flow communication with cooling water inlet and drain lines provided in the cabinet for circulating cooling water through other components of the oscillator circuit.

7 Claims, 5 Drawing Figures

WATER COOLED GRID RESISTOR ASSEMBLY FOR RADIO FREQUENCY INDUCTION HEATING GENERATOR

This invention relates to the art of induction heating and, more particularly, to an improvement in the grid resistor assembly in the oscillator circuit of an induction heating radio frequency generator.

As is well known in the art of induction heating, the oscillator circuit equipment in a vacuum tube type radio frequency generator is disposed within a metal cabinet of considerable size and which is adapted to be closed for protective purposes. The component parts of the oscillator circuit are well known and include, basically, a tank circuit including a tubular tank coil and a tank capacitor, and an oscillator tube which controls current flow into the tank circuit. The oscillator tube includes a grid which is driven from the tank circuit and controls conduction of the oscillator tube. The grid drive circuit includes a grid coil magnetically coupled with the tank coil and a grid resistance in series with the grid coil.

The above components of the oscillator circuit are of considerable size and are disposed within and suitably supported by the equipment cabinet. During operation of the induction heating generator the oscillator circuit components give off considerable heat and, accordingly, a number of the components including the tank coil and tank capacitor are water cooled to reduce the heat output and accordingly the air temperature within the cabinet. The grid resistor unit generally includes a plurality of power resistors which also produce considerable heat during operation. Heretofore, motor driven fans, alone or in combination with water cooled radiator type heat dissipators, have been employed to circulate air through the equipment cabinet and across the resistor elements to cool the latter.

Cooling the resistance elements in the foregoing manner is undesirable for several reasons. In this respect, the heat dissipated thereby raises the temperature of the air circulated through the cabinet. While the air temperature can be reduced to some extent through the use of a radiator type heat exchanger, the latter is reasonably expensive and consumes considerable space within the cabinet. Moreover, the heat dissipated by the resistors is circulated and is not directly removed from the cabinet. Accordingly, air temperature reduction within the cabinet by means of such a radiator is somewhat limited, and the air temperature is still undesirably high.

A further disadvantage of air cooled resistor units resides in the fact that there is a limit to the extent to which the heat thereof can be dissipated and the temperature thereof reduced. This often results in requiring a considerable number of resistors connected in parallel in order to provide sufficient wattage for the grid control function thereof.

In accordance with the present invention, a grid resistor assembly is provided by which the foregoing disadvantages, and others, encountered in connection with the air cooled resistor units is minimized. More particularly, in the grid resistor assembly of the present invention the resistor elements are cooled by the circulation of cooling water thereacross. Thus, the heat dissipated by the resistors is removed directly by the circulating cooling water and the heat content of the radio frequency generator cabinet is substantially reduced. Further, cooling of the resistors by circulating water thereacross enables a reduction in the temperature of the resistance elements per se, whereby less resistor elements are required to achieve the effective wattage desired to achieve the control function of the resistors.

In accordance with one aspect of the present invention, the water cooled grid resistor assembly includes at least two power resistors connected in series and disposed in a closed tube of non-conductive material through which the cooling water is circulated. The power resistors are provided with leads extending through the closed tube for connection in the oscillator circuit, and the tube housing the resistors is suitably supported within the equipment cabinet such as on a wall thereof. The closed tube is further provided with inlet and outlet connections adapted to be connected one to a source of cooling water supply and the other to an outlet or drain line for the water. The cooling water source can be tapped from the inlet cooling water supply provided for cooling the tank coil and tank capacitor components and the like, or a separate water supply can be provided for the grid resistor assembly.

Water cooling of the resistor elements as achieved in accordance with the present invention advantageously enables elimination of the radiator type heat transfer unit heretofore used to cool the air blown across the exposed resistance elements. It will be appreciated, however, that such a fan and radiator unit can be employed in connection with the water cooled resistor unit of the present invention to achieve circulation of air within the cabinet and cooling of the air circulated to further reduce the heat content within the cabinet.

It is an outstanding object of the present invention to provide an improved grid resistor assembly for the oscillator circuit of a vacuum tube radio frequency generator for induction heating equipment.

A further object is the provision of a grid resistor assembly of the foregoing character which is disposed within the cabinet housing the oscillator circuit equipment and which enables minimizing the air temperature within the cabinet during operation of the induction heating equipment.

Another object is the provision of a grid resistor assembly of the foregoing character in which the resistor elements are cooled more effectively and efficiently than heretofore possible.

Yet another object is the provision of a grid resistor assembly of the foregoing character which provides for minimizing the temperature of the resistor elements whereby fewer resistor elements than heretofore required are needed to achieve a desired wattage in the gird circuit.

A further object is the provision of a grid resistor assembly of the foregoing character in which the resistor elements are water cooled.

Still a further object is the provision of a water cooled grid resistor assembly of the foregoing character in which cooling water is circulated across the resistor elements to directly transfer the heat dissipated thereby from the cabinet, thus to reduce the heat content of the radio frequency generator cabinet.

The foregoing objects, and others, will in part be obvious and in part pointed out more fully hereinafter in conjunction with the written description of a preferred embodiment of the invention illustrated in the accompanying drawings in which.

Figure 1:
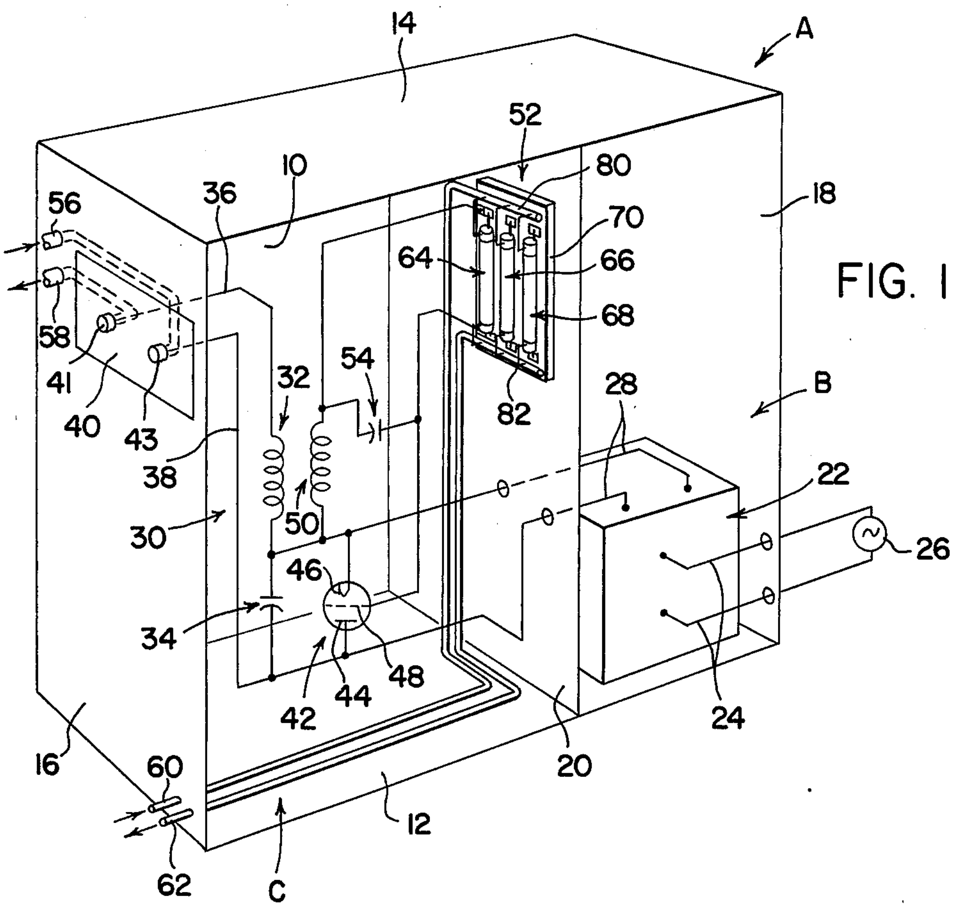
FIG. 1 is a schematic illustration of the power supply and radio frequency oscillator circuits of a vacuum tube radio frequency generator disposed in a compartmented cabinet, and a grid resistance assembly in accordance with the present invention.

Referring now in greater detail to the drawings wherein the showings are for the purpose of illustrating a preferred embodiment of the invention only and not for the purpose of limiting the invention, FIG. 1 schematically illustrates power supply and radio frequency oscillator circuit components of a radio frequency induction heating generator disposed within corresponding chambers of an equipment cabinet A. As is well known, a wide variety of cabinet structures, either unitary and compartmented or separate, are employed in connection with such generator equipment to house and support the various components of the power supply and radio frequency oscillator circuits. Any suitable cabinet structure can be employed and, in the embodiment illustrated, cabinet A is of sheet metal construction and includes a back wall 10, a bottom wall 12, a top wall 14, an opposed pair of upright side walls 16 and 18, and an upright partition wall 20 which divides the interior of the cabinet into a power supply compartment B and an oscillator circuit compartment C. Though not illustrated, it will be appreciated that the cabinet is adapted to be closed for protective purposes such as by a removable panel or door members associated with the cabinet walls.

The physical construction of the circuit components and the arrangement thereof within cabinet A, for the most part, is not pertinent with regard to the present invention. As will become apparent hereinafter, the water cooled grid resistor assembly of the present invention can be employed with any radio frequency generator equipment having a vaccum tube oscillator circuit including a grid resistance assembly. Accordingly, the circuitry depicted in FIG. 1 is illustrated schematically and is intended merely to show in general the components of the power supply and oscillator circuits disposed in the respective compartments of the cabinet, and one possible structural arrangement of the grid resistor assembly of the present invention with the cabinet structure illustrated.

As shown in FIG. 1, compartment B of cabinet A is provided with a transformer and rectifier assembly 22 including a pair of leads 24 by which the primary of the transformer is connected to a suitable alternating current supply 26. In a well known manner, the transformer and rectifier assembly increases the supply voltage and rectifies the Ac voltage to provide a high voltage direct current output through leads 28 to the oscillator circuit in compartment C of the cabinet. Basically, the oscillator circuit in compartment C includes a tank circuit 30 including a tank coil 32, a tank capacitor 34, and a pair of leads 36 and 38 adapted to be connected to the opposite ends of an inductor to be energized by the generator unit. Wall 16 of the cabinet illustrated is provided with an output panel 40 supporting tubular couplings 41 and 43 to which leads 36 and 38 are electrically connected and which, in a well known manner, facilitate connection of an inductor with the terminal ends of leads 36 and 38. The oscillator circuit further includes an oscillator tube 42 connected across power supply leads 28 and which tube includes a plate or anode 44, a cathode 46, and a grid element 48. Grid 48 is driven from the tank circuit and, in this respect, includes a grid coil 50 magnetically coupled with tank coil 32, a grid resistor assembly 52 in series with coil 50, and a grid capacitor 54 in parallel with the grid resistance As is well known, the induction heating coil associated with such radio frequency generator equipment is a tubular conductor having its opposite ends connected to a suitable source of cooling fluid such as water. Accordingly, wall 16 of cabinet A is provided with water inlet and outlet coupling 56 and 58, respectively, which are connectable to water inlet supply and drain lines to facilitate the circulation of cooling water through the inductor. The inner ends of couplings 56 and 58 are suitably connected inside the cabinet to the inductor couplings 41 and 43 on output panel 40. As is further well known, components of the oscillator circuit including the tank coil and tank capacitor are water cooled by circulation of cooling water through the tank coil which is of tubular construction and through a cooling jacket surrounding the tank capacitor. Accordingly, wall 16 of cabinet A is provided with cooling water inlet and outlet couplings 60 and 62, respectively, which are connectable to cooling water supply and drain lines. It will be appreciated that suitable conduit lines, couplings, control valves and the like, not illustrated, are disposed in compartment C and connected to the components to be cooled in a manner which facilitates the required wate circulation.

As mentioned hereinabove, the circuit components in cabinet compartment C are quite large and occupy a considerable amount of the available space in the compartment. Cabinets for such power supply and radio frequency generator units vary in size depending on the equipment housed therein, and a cabinet having power supply and oscillator circuit compartments of the character described above may, for example, have a height of about 72 inches, a width of about 60 inches and a depth of about 36 inches. During use, the power supply and oscillator circuit equipment dissipates a considerable amount of heat whereby, even with water cooling of certain of the circuit components, an undesirably high air temperature exists within the closed cabinet. One source of such heat dissipation is the grid resistor unit in the oscillator circuit.

Figure 2:
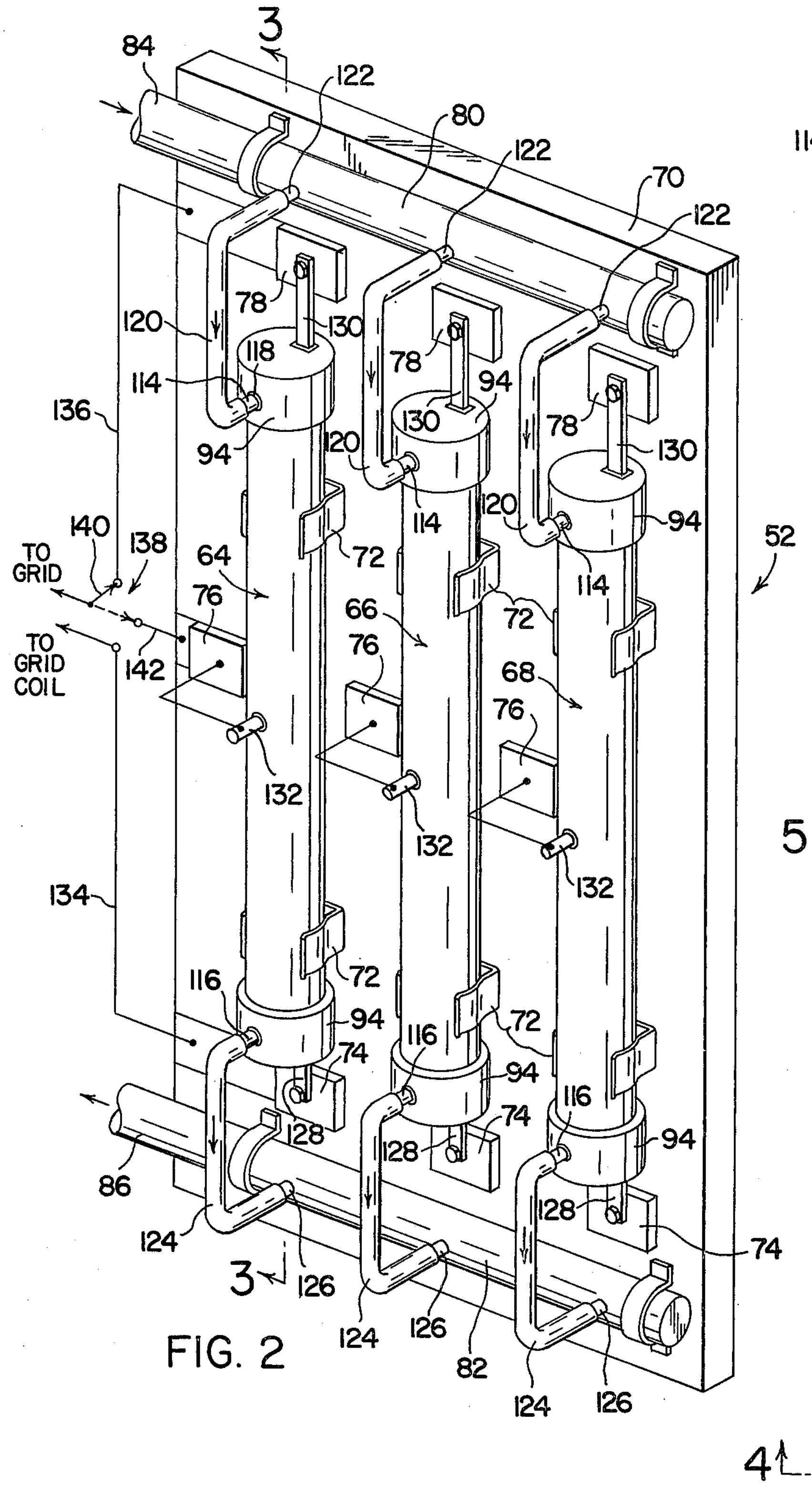
FIG. 2 is an enlarged perspective view of the grid resistor assembly shown in FIG. 1.

In accordance with the present invention, a unique grid resistor assembly is provided which eliminates the necessity for circulating cooling air across the resistor elements and by which a reduction in cabinet air temperature is achieved together with maintenance of a lower temperature of the resistance elements than is possible with air cooling. In this respect, grid resistor assembly 52 includes one or more grid resistor units which are adapted to be water cooled so that the heat dissipated by the resistor units is transferred from the cabinet by the circulating cooling water. In the embodiment illustrated, as best seen in FIG. 2, grid resistor assembly 52 is comprised of three grid resistor units 64, 66 and 68 mounted on a support panel 70 such as by corresponding spring clips 72. Support panel 70 is of suitable electrical insulating material and adapted to be mounted by bolts or the like on a wall of the cabinet such as partition wall 20. Panel 70 is provided with sets of contacts or terminals 74, 76 and 78 for each of the resistor units. Further, panel 70 supports a cooling water supply pipe 80 at one end of the resistor units and a cooling water discharge pipe 82 at the opposite ends of the resistor units.

Supply pipe 80 has an inlet end 84 and discharge pipe 82 has an outlet end 86, and it will be appreciated that the other ends of pipes 80 and 82 are suitably closed. Inlet end 84 of pipe 80 is connected by suitable conduit with a cooling water supply line leading from a source of cooling water, and outlet end 86 of pipe 82 is connected by suitable conduit with a cooling water drain line. As illustrated schematically in FIG. 1, the supply and drain lines for the water cooled resistor assembly can be connected with inlet and outlet connections 60 and 62 of the cooling water circulating system for others of the components of the oscillator circuits. It will be appreciated, however, that a separate source of cooling water can be employed for the resistor assembly if desired.

Figure 4:
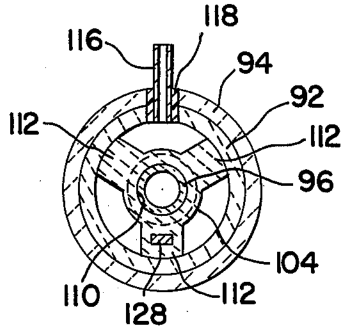
FIG. 4 is a cross-sectional elevation view of the grid resistor unit, the section being along line 4—4 in FIG. 3; and, FIG. 5 is a cross-sectional elevation view of the grid resistor unit, the section being along line 5—5 in FIG. 3.
Figure 5:
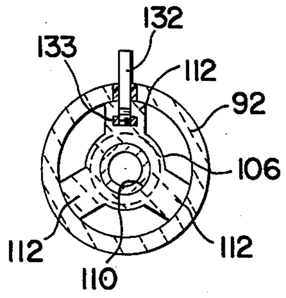
Figure 3:
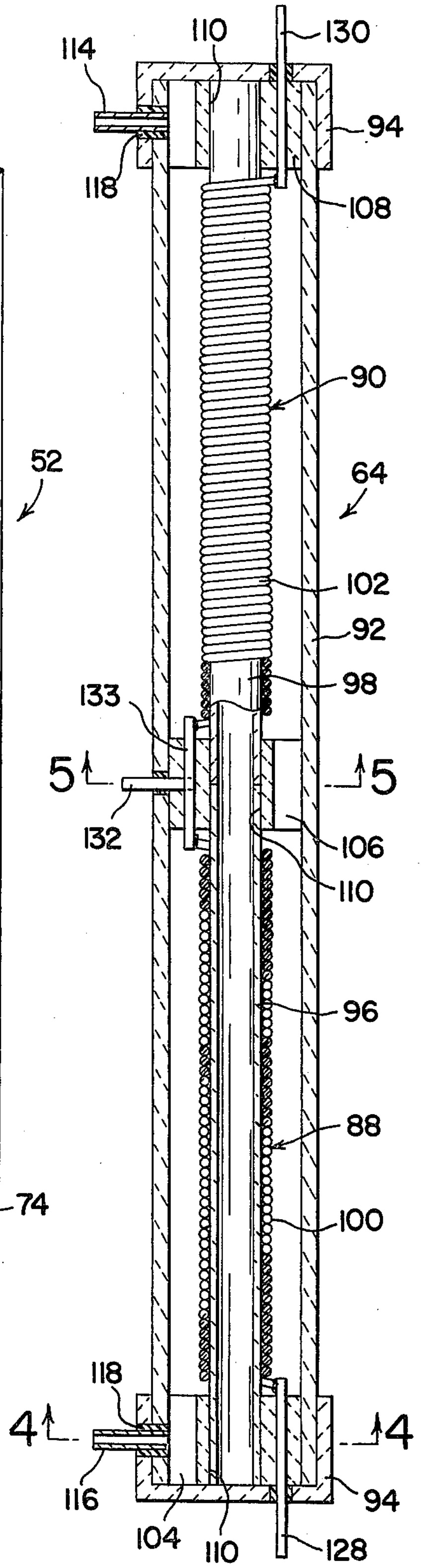
FIG. 3 is a sectional elevation view of a water cooled grid resistor unit of the assembly illustrated in FIG. 2; the view being along line 3—3 in FIG. 2.

The structure of resistance units 64, 66 and 68 and their structural association with support panel 70, water supply pipe 80 and discharge pipe 82 is identical. Accordingly, only one of the resistance units, namely unit 64, will be described in detail hereinafter, and it will be appreciated that the description thereof is applicable to the remaining two resistance units. As best seen in FIGS. 3–5, resistance unit 64 includes a pair of power resistors 88 and 90 electrically connected in series and supported within a non-conductive pipe or tubular casing 92 of suitable electrical insulating material. The opposite ends of tube 92 are provided with end caps 94 of non-conductive material and which end caps are suitably bonded or otherwise mounted on tube 92 to provide a fluid seal along the juncture therebetween.

Power resistors 88 and 90 include corresponding support members or cores 96 and 98 in the form of ceramic tubes or the like, and corresponding resistance wire windings 100 and 102 coiled about the core. As is well known in the induction heating art, such resistance wire is a fine wire provided with an insulating lacquer coating to prevent shorting between the convolutions thereof. The lacquer coating also electrically insulates the windings from cooling water which flows through tube 92 as set forth hereinafter. Resistors 88 and 90 are supported within tube 92 in concentric relationship therewith by support blocks 104, 106 and 108, each of which is provided with an aperture 110 therethrough adapted to receive the corresponding end of cores 96 and 98. Each support block further includes a plurality of radially extending legs 112 which engage the inner surface of tube 92 to radially position the resistors within the tube.

In the embodiment illustrated, the opposite ends of tube 92 and the corresponding end caps 94 are radially apertured to receive and support cooling water inlet and outlet tubes 114 and 116, respectively. A sealing sleeve or potting compound 118 is interposed between tubes 114 and 116 and the corresponding apertures therefor to achieve a fluid tight seal therebetween. Inlet tube 114 is connected with cooling water supply pipe 80 by a fluid line 120 which may, for example, be a flexible rubber hose, one end of which receives tube 114 and the other end which receives a tube 122 opening into supply pipe 80. Similarly, outlet tube 116 is connected to discharge pipe 82 by a fluid line 124 one end of which receives tube 116 and the other end of which receives a tube 126 opening into outlet pipe 82.

As will be seen in FIGS 3 and 4, legs 112 of support members 104 and 108 at opposite ends of tube 92 are circumferentially positioned within tube 92 so as to avoid interference thereof with the flow of cooling water into and out of the tube. Further, it will be seen that the lower one of the legs 112 of support member 104 is provided with an electrical lead 128 embedded therein to extend axially therethrough, and that the lower one of the legs 112 of support member 108 is provided with a similar electrical lead 130. The corresponding end of winding 100 or resistor 88 is connected to the inner end of lead 128, and the corresponding end of winding 102 of resistor 90 is connected to the inner end of lead 130.

Support member 106 between resistors 88 and 90 is disposed in tube 92 with one of the legs 112 extending upwardly. The upwardly extending leg is provided with a T-shaped electrical connection including a leg 132 and a cross member 133. Cross member 133 of the T has axially opposite ends facing a corresponding one of the resistors 88 and 90, and leg 132 of the T extends outwardly through an opening therefor in tube 92. The inner end of leg 132 is, for example, threadedly interengagable with cross member 133 to facilitate assembly of the resistor unit. The inner ends of windings 100 and 102 of the resistors are connected to the corresponding one of the axially opposite ends of cross member 133 of the T-shaped lead, and the outer ends of leads 128, 130 and 132 are adapted to be suitably connected electrically with terminal plates 74, 78 and 76, respectively. Insulating material such as a suitable potting compound can be employed to cover the connections between the ends of the resistance windings and the electrical leads and to fill the openings into which the leads extend in tube 92 and end caps 94 in order to seal the resistance unit at these points and to electrically insulate the leads from the cooling water flow through the unit. It will be appreciated from the foregoing description, that cooling water is introduced into the resistance unit from pipe 80 and flows therethrough to pipe 82, whereby the heat dissipated by resistors 88 and 90 is removed by the cooling water circulation.

Intermediate electrical lead 132 between resistors 88 and 90 advantageously enables connecting one of the resistors in the grid circuit, or connecting resistors 88 and 90 in series in the grid circuit. In this respect, for example, a pair of leads 134 and 136 can be connected respectively to terminals 74 and 78, and a suitable selector switch 138 can be provided in lead 136. Switch 138 includes a switch arm 140 selectively positionable to engage a contact associated with lead 136 and a second contact associated with a lead 142 connected to terminal 76. With switch 138 positioned as shown by solid lines in FIG. 2, resistors 88 and 90 are connected in series in the grid circuit, and when the switch is positioned as illustrated by broken lines in FIG. 2 only resistor 88 is connected in the grid circuit. It will be further appreciated that by providing appropriate leads interconnecting the various resistor unit terminals on support plate 70 a wide variety of combinations can be obtained for connecting selected resistors in series and/or parallel in the said circuit, and that suitable selector switch devices can be employed to enable such selectivity to be achieved by switch actuation as opposed to manual rearrangement of the leads. Circuit arrangements for achieving these functions are well within the skill of the art and are not pertinent to the present invention.

While considerable emphasis has been placed herein on a specific resistor structure and a specific structural association between a pair of resistors and a tubular housing which provides for water cooling of the resistors, it will be appreciated that a wide variety of resistor structures and water cooling arrangements therefor can be devised without departing from the principles of the present invention. Many such structures and arrangements as well as modifications of the embodiment disclosed will be obvious from the foregoing description and the end results provided thereby. In this respect, for example, it will be appreciated that more or less than three resistance units can be employed depending on the size of the radio frequency generator equipment. Further, it will be appreciated that the resistor unit can include one power resistor rather than a pair of series connected resistors as illustrated, and that the resistor unit can include more than two power resistors connected in series if desired. Still further, it will be appreciated that any suitable support arrangement can be provided for the resistor unit or units and that individual cooling fluid lines could be provided as opposed to the common input and discharge tubes illustrated and described hereinabove. Moreover, while the grid resistance assembly is illustrated as being supported on the partition wall of the cabinet structure shown, and on a unitary support plate mounting on the wall, it will be appreciated that the location of the assembly within the cabinet is not important and that any suitable arrangement for mounting the resistor units relative to the cabinet and to one another can be employed. Accordingly, since many possible embodiments of the invention can be made and since many changes can be made in the embodiment herein illustrated and described, it is to be distinctly understood that the foregoing descriptive matter is to be interpreted merely as illustrative of the invention and not as a limitation.

What is claimed is:

1. In a radio frequency induction heating generator including oscillator circuit means and cabinet means enclosing said circuit means and wherein said circuit means includes oscillator tube means having a grid resistance means electrically connected with said grid, the improvement comprising: means including casing means supporting said grid resistance means with respect to said cabinet means, said casing means enclosing said grid resistance means in spaced relationship with respect thereto and in sealed relationship with respect to the interior of said cabinet means, and means providng inlet and outlet passageways in said casing means for flowing cooling liquid therethrough in heat transfer relationship with said grid resistance means.

2. The improvement according to claim 1, wherein said casing means includes a tubular body portion having axially opposite ends, said inlet and outlet passageways opening into said body portion at axially spaced locations between said opposite ends.

3. The improvement according to claim 2, wherein said casing means further includes end cap means closing said opposite ends of said body portion.

4. The improvement according to claim 2, wherein said grid resistance means includes at least two electrical resistance elements axially adjacent one another in said body portion and electrically connected in series, said spaced locations being adjacent the axially opposite ends of said resistance elements.

5. The improvement according to claim 4, wherein said casing means further includes an end cap closing each of said opposite ends of said body portion, said body portion and end caps being of electrical insulating material.

6. The improvement according to claim 5, and electrical lead means for said resistance means, said lead means including a lead extending through each of said end caps and electrically connected to the adjacent end of the corresponding one of said resistance elements, and a lead extending through said body portion and electrically connected to said resistance elements between the axially adjacent ends thereof.

7. The improvement according to claim 4, wherein said resistance elements each include a wire coil, core means supporting said coils, and support members in said tubular body portion supporting said core means and coils in spaced relationship with respect to said body portion.

* * * * *